United States Patent
Rheaume et al.

(10) Patent No.: US 10,124,911 B2
(45) Date of Patent: Nov. 13, 2018

(54) TAXI TUG WITH AUXILIARY POWER SERVICES

(71) Applicant: Hamilton Sundstrand Corporation, Charlotte, NC (US)

(72) Inventors: Jonathan Rheaume, West Hartford, CT (US); Stephen E. Tongue, Hampden, MA (US); Thomas P. Filburn, Granby, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 11 days.

(21) Appl. No.: 15/460,966

(22) Filed: Mar. 16, 2017

(65) Prior Publication Data
US 2017/0267377 A1  Sep. 21, 2017

Related U.S. Application Data

(60) Provisional application No. 62/310,191, filed on Mar. 18, 2016.

(51) Int. Cl.
| | | |
|---|---|---|
| *B64F 1/22* | (2006.01) | |
| *B64F 1/34* | (2006.01) | |
| *B64F 1/36* | (2017.01) | |

(52) U.S. Cl.
CPC ............ *B64F 1/225* (2013.01); *B64F 1/228* (2013.01); *B64F 1/34* (2013.01); *B64F 1/364* (2013.01); *B64D 2221/00* (2013.01); *B64F 1/224* (2013.01)

(58) Field of Classification Search
CPC .......... B64F 1/225; B64F 1/228; B64F 1/364; B64F 1/224; G08G 5/06; B64D 2221/00

USPC ........... 180/14.4, 14.7, 19.1–19.3, 53.5, 904; 244/50, 114 R; 414/426
See application file for complete search history.

(56) References Cited

U.S. PATENT DOCUMENTS

| | | | | |
|---|---|---|---|---|
| 4,007,890 A | * | 2/1977 | Bremer | B60T 8/1703 180/904 |
| 4,113,041 A | * | 9/1978 | Birkeholm | B60K 31/00 180/14.1 |
| 4,658,924 A | * | 4/1987 | Dobbie | B64F 1/22 180/14.1 |
| 5,381,987 A | * | 1/1995 | Carns | B64F 1/22 123/142.5 R |
| 6,305,484 B1 | * | 10/2001 | Leblanc | B60T 7/16 180/167 |
| 6,424,891 B1 | | 7/2002 | Sargent et al. | |

(Continued)

FOREIGN PATENT DOCUMENTS

| | | |
|---|---|---|
| DE | 3423867 A1 | 1/1986 |
| EP | 0206528 A1 | 12/1986 |

(Continued)

OTHER PUBLICATIONS

European Search Report from the European Patent Office; EP Application No. 171618721; dated Aug. 23, 2017; 10 pages.

*Primary Examiner* — Anne Marie M Boehler
(74) *Attorney, Agent, or Firm* — Cantor Colburn LLP

(57) ABSTRACT

A taxi tug includes a chassis, a motive power source, and an auxiliary power services system. The chassis has at least one drive wheel. The motive power source is operatively connected to the at least one drive wheel. The auxiliary power services system is disposed on the chassis and is configured to provide at least one of electric power, pneumatic power, and low pressure conditioned air to an aircraft.

5 Claims, 2 Drawing Sheets

(56) References Cited

U.S. PATENT DOCUMENTS

| | | | |
|---|---|---|---|
| 7,712,760 B2 * | 5/2010 | Ohtomo | B60W 20/50 |
| | | | 104/87 |
| 8,181,725 B2 * | 5/2012 | Andres | B64C 25/50 |
| | | | 180/11 |
| 9,090,358 B2 * | 7/2015 | Perry | B64F 1/227 |
| 2011/0073388 A1 | 3/2011 | Andres et al. | |
| 2011/0127366 A1 * | 6/2011 | Becker | B64F 1/22 |
| | | | 244/50 |
| 2012/0045906 A1 | 2/2012 | Thomas | |
| 2015/0274323 A1 | 10/2015 | Loignon et al. | |
| 2016/0001895 A1 * | 1/2016 | Tengman | B64F 1/305 |
| | | | 165/248 |
| 2016/0159497 A1 * | 6/2016 | Zhou | B64F 1/227 |
| | | | 307/9.1 |
| 2017/0029136 A1 * | 2/2017 | Gendre | B64F 1/22 |

FOREIGN PATENT DOCUMENTS

| | | | |
|---|---|---|---|
| EP | 0350615 A2 | | 1/1990 |
| FR | 2675919 A1 | | 10/1992 |
| GB | 2516708 | * | 4/2015 |
| WO | 2011066891 A1 | | 6/2011 |

* cited by examiner

TAXI TUG WITH AUXILIARY POWER SERVICES

CROSS-REFERENCE TO RELATED APPLICATIONS

This application claims the benefit of 62/310,191 filed Mar. 18, 2016, which is incorporated herein by reference in its entirety.

BACKGROUND

The present disclosure relates to a taxi tug with auxiliary power services for an aircraft.

Aircraft engine power is used to taxi the aircraft to or from a runway. Operation of the aircraft engines in a ground environment may be relatively loud and, when used to provide aircraft ground movement, may burn relatively large quantities of fuel. Vehicles often referred to as a tug are typically utilized to facilitate the ground movement of aircraft. The tug is a small manned vehicle which couples to the aircraft nose gear such that the vehicle may push or tow the aircraft. The tug commonly utilizes a separate tow bar system for attachment to the aircraft nose gear. The aircraft tug pushes the aircraft back from the terminal gate and tows the aircraft for maintenance operations.

BRIEF DESCRIPTION

According to an embodiment of the present disclosure, a taxi tug is provided. The taxi tug includes a chassis, a motive power source, and an auxiliary power services system. The chassis has at least one drive wheel. The motive power source is operatively connected to the at least one drive wheel. The auxiliary power services system is disposed on the chassis and is configured to provide at least one of electric power, pneumatic power, and low pressure conditioned air to an aircraft.

According to another embodiment of the present disclosure, a taxi tug is provided. The taxi tug includes a chassis, a motive power source, at least one of an electrical power source having an electrical connector and a pneumatic power source having a pneumatic connector disposed on the chassis, a proximity sensor, and a control module. The motive power source is disposed on the chassis and is operatively connected to at least one drive wheel. The electrical power source is disposed on the chassis and has an electrical connector. The proximity sensor is arranged to provide a position signal indicative of a position of the chassis relative to an aircraft. The control module is disposed on the chassis. The control module is programmed to operate the motive power source to drive the at least one drive wheel to position the chassis proximate the aircraft.

BRIEF DESCRIPTION OF THE DRAWINGS

The subject matter that is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
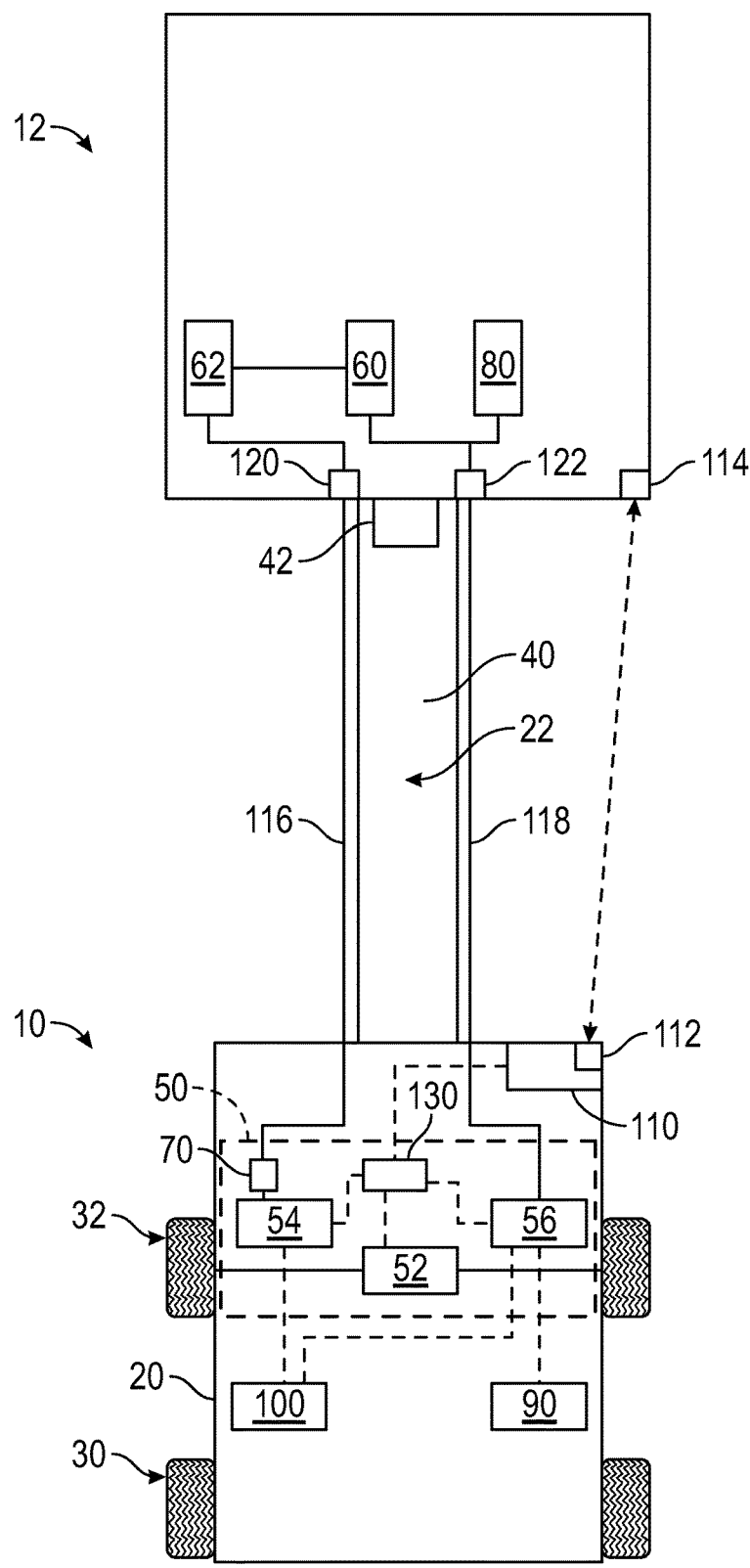
FIG. 1 is a schematic of a taxi tug having auxiliary power services interfacing with an aircraft.

Commercial aircraft typically expend 2-3% of mission fuel burn during taxi. Idling aircraft engines during taxi and other non-flight operations are inefficient and polluting. At partial load, aircraft engines emit hydrocarbons and carbon monoxide because of low combustion temperatures that discourage complete combustion. Anticipated global air traffic growth may exacerbate these problems if unchecked. Referring to FIG. 1, a taxi tug 10 provides auxiliary power services to an aircraft 12 and may save airlines 2-3% in fuel burn, reduce emissions, and decrease noise by providing auxiliary power services without operation of the aircraft engine or auxiliary power unit.

The taxi tug 10 is configured to provide motive power to move the aircraft 12 as well as auxiliary power services to power aircraft loads during taxi so that no power flows from the aircraft main engines or the aircraft auxiliary power unit. The taxi tug 10 provides auxiliary power unit services beyond the terminal gates while simultaneously performing aircraft taxi functions. The provision of these services by the taxi tug 10 may greatly reduce airport pollutants, fuel burn, and noise.

The taxi tug 10 is configured to engage a main gear or nose gear assembly of the aircraft 12 to push or pull the aircraft 12 to a desired location. The taxi tug 10 provides the motive force when the aircraft is not under aircraft engine power. The taxi tug 10 includes a chassis 20 and a push member or tow member 22.

The chassis 20 includes at least one steerable wheel 30 and at least one drive wheel 32. In at least one embodiment, the steerable wheel 30 and the drive wheel 32 are the same wheel. The chassis 20 is at least partially supported by the at least one steerable wheel 30 and at least one drive wheel 32.

The push member or tow member 22 includes a bar 40 that extends from the chassis that mechanically interfaces with at least one of a nose gear assembly, a main gear assembly, a wheel, or other part of the aircraft. In at least one embodiment, the push member or tow member 22 is configured to be coupled to a feature of the aircraft such as a hitch extending from the aircraft fuselage or may be a sling or other type of support member that engages the aircraft fuselage. In at least one embodiment, the push member or tow member 22 is configured as a cradle or platform that receives and upon which an aircraft wheel of either the nose landing gear assembly or the main landing gear assembly 42 rests. The push member or tow member 22 is configured to transfer motive power from the taxi tug 10 to the aircraft 12 to move the aircraft 12.

The taxi tug 10 includes an auxiliary power services system 50 that includes a motive power source 52, a pneumatic power source 54, and an electrical power source 56. The motive power source 52 is operatively connected to the at least one drive wheel 32. The motive power source 52 is configured to drive the at least one drive wheel 32 to move the taxi tug 10 and enables the taxi tug 10 to push or tow the aircraft 12. In at least one embodiment, the motive power source 52 is configured to provide electricity to power a motor-generator 60 of the aircraft 12.

The motive power source 52 may include a drivetrain having an electric, hybrid electric, hybrid electric diesel (ULSD), hybrid turbo-electric, and an electric fuel cell (Polymer Exchange Membrane or Solid Oxide Fuel Cell). In at least one embodiment, the auxiliary power services system 50 and the motive power source 52 are one in the same.

The pneumatic power source 54 may be a pneumatic system that provides pneumatic power in the form of compressed air to the aircraft 12 through a supply duct or supply line. In at least one embodiment, the supply duct or supply line runs along or runs through the push member or tow member 22. The pneumatic power source 54 may provide high pressure air to the aircraft 12 to run an air management system such as an environmental control system 62, to start the aircraft main engines, and to prevent ice buildup on the wings. In at least one embodiment, the pneumatic power source 54 may also provide conditioned low pressure air from a pack 70 located on the taxi tug. The pack 70 is configured to condition ambient air that is received by heating, cooling, and/or varying the humidity of ambient air and providing the conditioned air to the environmental control system 62 of the aircraft 12. The pneumatic power source 54 may be a separate compressor driven off of the motive power source 52 or driven by the electrical power source 56, etc. In at least one embodiment, the pneumatic power source 54 may be an APU disposed on the chassis 20 or the motive power source 52 in which pressurized air is bled from a compressor.

The electrical power source 56 is configured to provide any form of electricity to the aircraft 12 (e.g. 115 VAC/400 Hz and others) through a cable. In at least one embodiment, the cable and associated supply line runs along or runs through the push member or tow member 22. The electrical power source 56 is configured to provide electrical power to an aircraft electric architecture 80 that may be electrically connected to the environmental control system 62, that may be electrically connected to a starter for the aircraft main engines, and that may be electrically connected to a heater disposed within or on the wings to prevent ice buildup on the wings.

The taxi tug 10 includes an energy storage system 90. The energy storage system 90 is at least one of a fuel storage system that is operatively connected to the motive power source 52 and a battery system that is operatively connected to the electrical power source 56 and stores electrical power produced by the electrical power source 56.

The taxi tug 10 further includes a monitoring system 100 that monitors the transfer of auxiliary power services to the aircraft. The monitoring system 100 is configured to monitor and regulate the transfer of pressurized air provided by the pneumatic power source 54 to the aircraft 12. For example, the air pressure in the supply duct or supply line may be monitored and the signal may be provided back to the pneumatic power source 54 to vary or maintain the air pressure. The monitoring system 100 is further configured to monitor and regulate the transfer of electric power provided by the electrical power source 56 to the aircraft 12. For example, the voltage, the current, or the power supplied through the electrical connector may be monitored and the signal may be provided back to the electrical power source 56 to vary or maintain the voltage, the current, or the power.

The taxi tug 10 further includes a communication system 110. The communication system 110 is configured to communicate with taxi tugs, the aircraft 12, the terminal, or air traffic control. The communication system 110 may be a wireless communication system.

The communication system 110 is arranged to provide signals indicative of a level of electric power available, air pressure available, energy storage level, status of the taxi tug 10 (e.g. online or offline), a position/path of the taxi tug 10, or the like to other taxi tugs, the aircraft 12, the terminal, or air traffic control. The communication system 110 is arranged to receive information or signals indicative of the state of an aircraft main engine (e.g. on/off, starting/shutting down). The communication system 110 enables the taxi tug to avoid impact events or other incidents with other taxi tugs. In at least one embodiment, the taxi tug 10 communicates with air traffic control to coordinate the wireless maneuvering of the taxi tug 10.

The communication system 110 may further include a data transfer module 112 that is configured to transfer data to or from a communication module 114 disposed on the aircraft 12. The data transferred may be used in prognostics and health monitoring (PHIM), performance analysis, pre-flight or post-flight checks, navigation, etc. The data transfer may be performed wirelessly or through wired connections.

The taxi tug 10 may interface with electric systems, landing gear, and air management systems of the aircraft 12. The taxi tug 10 includes appropriate interfaces that are configured to interface with the electric systems, the landing gear, and air management systems of the aircraft. The taxi tug 10 includes at least one pneumatic connector 116 and at least one electrical power connector 118. The at least one pneumatic connector 116 and the at least one electrical power connector 118 are arranged to interface with a power receptacle such as a pneumatic port 120 disposed on the aircraft 12 and a power receptacle 122 (electrical power receptacle) of the aircraft 12, respectively. The taxi tug 10 is configured to accommodate the different locations of the pneumatic port 120 and the power receptacle 122. In at least one embodiment, the pneumatic port 120 and/or the power receptacle 122 are disposed on the main landing gear assembly 42.

Power for ground operation of the environmental control system 62, the aircraft electric architecture 80, a lighting system, hydraulic electric motor pumps, aircraft communication systems, aircraft navigation systems, lavatory operation, engine start, auxiliary power unit, and other requirements may be provided by the taxi tug 10. The aircraft auxiliary power unit and the aircraft main engine need not be operated when the taxi tug 10 is engaged and/or connected to the aircraft 12.

Prior to aircraft take off, the taxi tug 10 may interface with the aircraft 12 at the gate, perform the aircraft pushback function, and tow the aircraft to the runway, all while providing pneumatic power, electric power, or other auxiliary power services to the aircraft 12 so that the aircraft main engines and the aircraft auxiliary power unit remain off. Prior to disconnection, power from the taxi tug 10 may start at least one main engine of the aircraft 12. Since aircraft engines warm-up prior to takeoff, the taxi tug 10 decouples from the aircraft 12 to permit aircraft engine warm-up.

Upon aircraft landing, the taxi tug 10 may meet the aircraft 12 on the runway or taxiway. The taxi tug 10 and the aircraft 12 establish a mechanical connection via the tow member 22, a hitch, or a sling. The taxi tug 10 further interfaces with the aircraft 12 via the pneumatic port 120 and the power receptacle 122, the aircraft main engines may be turned off, and the taxi tug 10 tows the aircraft 12 to a destination while providing auxiliary or main power services. In order for the pilot to retain control of the aircraft 12, electricity from the taxi tug 10 may be provided to the aircraft 12 for the purpose of electric taxi. In this case, provisions are made so that the taxi tug 10 and aircraft 12 maintain a safe separation distance.

The taxi tug 10 decreases the aircraft main engine operation at partial load, which saves approximately 2% to 3% of fuel and decreases local emissions. Noise is also reduced because the taxi tug 10 may also be operated electrically and/or outfitted with noise abatement measures. The inhibition of operation of the aircraft main engines reduces the possibility of the ingestion of foreign objects by the aircraft main engines. A higher capability taxi tug 10 may eliminate the need for aircraft auxiliary power unit operation for pneumatic, electric, and shaft power at the gates.

Figure 2:
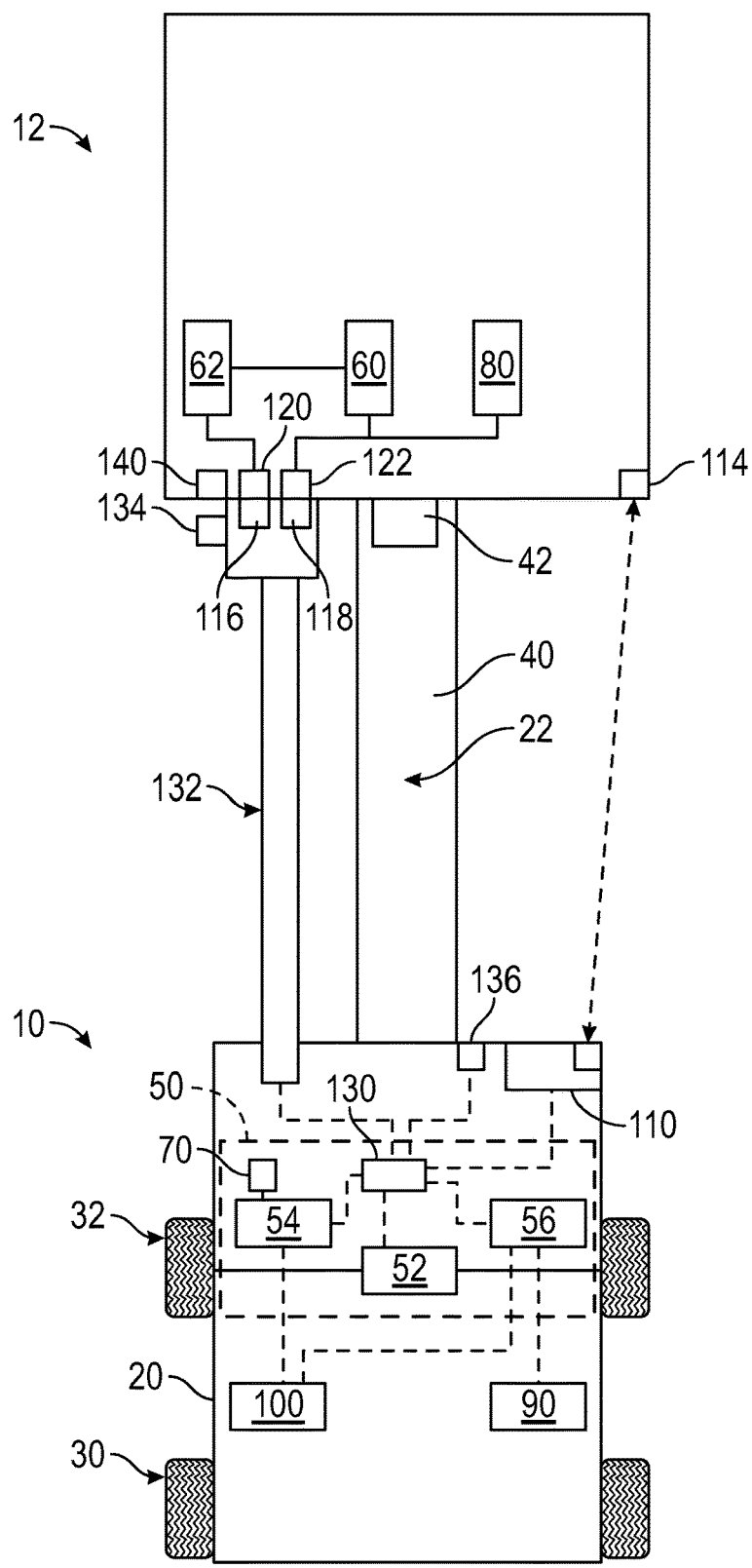
FIG. 2 is a flowchart of a method of operating the taxi tug having auxiliary power services.

Referring to FIG. 2, the taxi tug 10 is configured to autonomously interface with the aircraft 12. The autonomous or automated coupling and decoupling of auxiliary or main power services from the taxi tug 10 to the aircraft 12 enhances safety of an operator of the taxi tug 10 by autonomously coupling and decoupling the mechanical, electrical, and pneumatic interfaces. The taxi tug 10 includes a control module 130 that is in communication with the motive power source 52, the pneumatic power source 54, the electrical power source 56, the communication system 110, a movable arm 132, a position sensor 134, and a proximity sensor 136.

The at least one pneumatic connector 116, the at least one electrical power connector 118, and the position sensor 134 are disposed at a distal end of the movable arm 132. Responsive to a position signal provided by the proximity sensor 136 indicative of a position of the chassis 20 relative to the aircraft 12, the control module 130 operates the motive power source 52 to drive the at least one drive wheel 32 and to steer the at least one steerable wheel 30 to position the chassis 20 proximate the chassis. Responsive to the position signal provided by the proximity sensor 136 indicating that the taxi tug 10 is disposed proximate the aircraft 12 the control module 130 operates or manipulates the movable arm 132 to move the at least one pneumatic connector 116 and the at least one electrical power connector 118 towards the pneumatic port 120 and the power receptacle 122, respectively. The position sensor 134 is configured to monitor or detect a position or a location of a position feature 140 that is disposed on the aircraft 12 and is disposed proximate at least one of the pneumatic port 120 and the power receptacle 122. The control module 130 moves the movable arm 132, the at least one pneumatic connector 116, and the at least one electrical power connector 118 based on a location signal indicative of the location of the position feature 140 relative to the position sensor 134 to connect the at least one pneumatic connector 116 to the pneumatic port 120 and to connect the at least one electrical power connector 118 to the power receptacle 122.

The position feature 140 may be an emitter configured to provide or emit a magnetic field, infrared waves, optical waves, or a radio frequency configured to be detected or received by the position sensor 134. The position sensor 134 may be provided with a magnetic field sensor, an infrared receiver, a photodetector array, or radio receiver configured to receive the magnetic field, infrared waves, optical waves, or radio frequency emitted by the position feature 140.

Responsive to the starting of the aircraft main engines and/or the aircraft 12 being located at or proximate a gate, the control module 130 may operate the movable arm 132 to disconnect the at least one pneumatic connector 116 from the pneumatic port 120 and to disconnect the at least one electrical power connector 118 from the power receptacle 122.

The taxi tug 10 may also be applied to tugboats or other vessels. The taxi tug may be integrated with a tugboat that may not only move a watercraft, such as a ship, but may also provide electric power or other auxiliary power services so that the ship engines may be turned off while entering and/or exiting a port.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A taxi tug, comprising:
   a chassis;
   a movable arm disposed on the chassis;
   a tow member disposed on the chassis and arranged to selectively engage an aircraft;
   a motive power source disposed on the chassis and operatively connected to at least one drive wheel;
   at least one of an electrical power source having an electrical connector and a pneumatic power source having a pneumatic connector disposed proximate a distal end of the movable arm;
   a proximity sensor arranged to provide a position signal indicative of a position of the chassis relative to an aircraft;
   a position sensor disposed proximate the distal end of the movable arm, the position sensor is arranged to provide a location signal indicative of a location of a position feature disposed on the aircraft and is disposed proximate a power receptacle disposed on the aircraft;
   a communication system disposed on the chassis and in communication with the aircraft; and
   a control module disposed on the chassis and in communication with the motive power source, at least one of the electrical power source and the pneumatic power source, the proximity sensor, and the communication system, the control module programmed to operate the motive power source to drive the at least one drive wheel to position the chassis proximate the aircraft
   the control module is further programmed to operate the movable arm based on the location signal to connect the at least one of the electrical connector and the pneumatic connector to the power receptacle.

2. The taxi tug of claim 1, wherein the control module is further programmed to operate the movable arm to disconnect the at least one of the electrical connector and the pneumatic connector from the power receptacle, responsive to starting of an aircraft main engine.

3. The taxi tug of claim 1, further comprising:
   the communication system including a data transfer module that is configured to transfer data to or from a communication module disposed on the aircraft.

4. The taxi tug of claim 1, wherein the pneumatic power source is configured to provide conditioned air to the aircraft.

5. The taxi tug of claim 1, further comprising:
a monitoring system in communication with at least one of the pneumatic power source and the electrical power source, the monitoring system is configured to monitor and regulate a transfer to the aircraft of at least one of pressurized air provided by the pneumatic power source and electric power provided by the electrical power source.

\* \* \* \* \*